United States Patent Office 3,538,126
Patented Nov. 3, 1970

---

3,538,126
ANTHRONE OXIME COMPOUNDS
Winthrop E. Lange, Needham, Mass., and Ernest J. Sasmor, Yonkers, and Alfred Halpern, Great Neck, N.Y., assignors, by mesne assignments, to Synergistics, a copartnership consisting of Mortimer D. Sackler and Raymond D. Sackler, Yonkers, N.Y.
No Drawing. Filed July 3, 1968, Ser. No. 742,125
Int. Cl. C07c *131/00;* C07f *3/06, 15/02*
U.S. Cl. 260—351
17 Claims

ABSTRACT OF THE DISCLOSURE

Anthrone oxime derivatives of the general formula

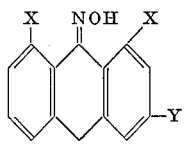

wherein X is a hydrogen or a hydroxyl group and Y is either a hydrogen atom, a methyl group, a hydroxymethyl group or a carboxyl group, together with the metal salts of the respective carboxy compound. The method for the preparation of the aforesaid compounds and pharmaceutical compositions useful as peristaltic stimulants and methods for achieving a laxative effect are also described.

---

This invention relates to new and novel anthrone-oxime derivatives, the methods for their preparation and the methods for their use in the therapy of humans and animals. In particular, it relates to the oxime of anthrone; the oxime of 1,8-dihydroxyanthrone; the oxime of 1,8-dihydroxy-3-methylanthrone; the oxime of 1,8-dihydroxy-3-hydroxymethylanthrone and the oxime of 1,8-dihydroxy-3-carboxyanthrone, metallic salts of the oxime of 1,8-dihydroxy-3-carboxyanthrone, the method for the preparation of these compounds and their use as peristaltic stimulants of humans and animals.

Anthrones are obtained by the reduction of the corresponding anthraquinone, which occurs in nature in a wide variety of plants. Anthraquinone compounds have been shown to have laxative properties and plants containing these compounds, as for example, senna and cascara, have been used as cathartics since biblical times. In their natural habitat, the anthraquinones are usually present in the form of glycosides in which the sugar moiety is usually glucose, although rhamnose has also been found in association with certain anthraquinones. By reducing the anthraquinone moiety, the corresponding anthrone derivative is obtained. Thus, 1,8-dihydroxy-3-hydroxymethylanthroquinone, known as aloe emodin; 1,8-dihydroxy-3-methylanthraquinone, known as chrysophanic acid and 1,8- dihydroxy-3-carboxyanthraquinone, known as rheinanthraquinone, all yield upon reduction, the corresponding respective anthrone compound.

Unfortunately, the anthrone or reduced form of the hydroxyanthraquinone compounds do not exist in this form for any appreciable time but rapidly oxidizes to the more stable hydroxy anthraquinone compound on contact with air and moisture. It is known that the reduced form of these aforesaid compounds is more potent pharmacologically than is the corresponding anthraquinone and consequently, the stabilization of the reduced compound would result in a more effective therapy. The various methods previously described to stabilize an anthrone compound in the reduced form have failed and on standing a decrease in pharmacologic potency of the anthrone compound was noted as the concentration of the oxidized anthraquinone increased.

It was found that by forming the oxime derivative of the respective anthrone compound that the neuroperistaltic stimulant activity of the new compound was equal to the free anthrone and superior to the corresponding anthraquinone. The respective oximes are stable under the ordinary conditions of storage without loss in biological potency and these new compounds are not oxidized to the corresponding pharmacologically inert anthraquinone derivatives on contact with air and moisture. Through the administration of these new oxime anthrone derivatives, a more desirable pharmacologic effect is obtained without the wide variations in biolgical effect as is observed when the naturally occurring products are administered. The reproducible and predictable pharmacologic effect occurring after the administration of these new oxime anthrone derivatives, provides better control of laxative therapy and result in a new therapeutic approach to the problem of constipation.

The oxime derivatives of anthrone, 1,8-dihydroxyanthrone, 1,8-dihydroxy-3-methylanthrone, 1,8-dihydroxy-3-hydroxymethylanthrone and 1,8-dihydroxy-3-carboxyanthrone are obtained by reacting hydroxyamine in alkaline media with the respective anthrone and isolating the corresponding new oxime-anthrone compound therefrom. The generic structural formula for the respective new anthrone oxime derivative may be represented as follows:

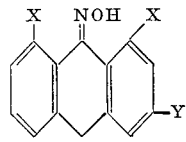

wherein X is a hydrogen or a hydroxyl group, and Y is either a hydrogen atom, a methyl group, hydroxymethyl group, or a carboxyl group. The specific structural formula for the respective new compounds may be represented as follows:

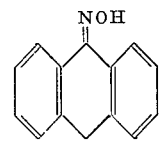

(a) Anthrone-Oxime (9, 10, dihydro-10-oxime anthracene)

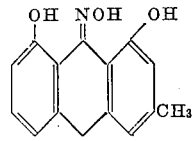

(b) 1,8-dihydroxy-3-methylanthrone-oxime

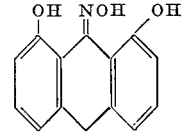

(c) 1,8-dihydroxyanthrone-oxime

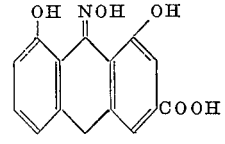

(d) 1,8-dihydroxy-3-carboxy anthrone-oxime

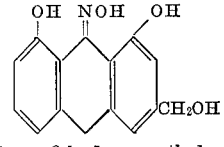

(e) 1,8-dihydroxy-3-hydroxymethyl anthrone-oxime

The oxime anthrone derivatives have reproducible and homogeneous properties and do not give the characteristic emerald green color test for anthrone when treated with p-nitrosoaniline. The compounds exhibit a unique ultraviolet and infrared spectrum, which serves to identify the various groups and to characterize the new molecules.

The new oxime derivatives were found to be biologically potent as laxatives when tested by the method of T. C. Lou, which is described in the Journal of Pharmacy and Pharmacology, vol. 1, pages 673–682 October 1949. The compounds are virtually non-toxic and may be administered to mammals to cause peristaltic stimulation.

When it is desired to use these new oxime anthrones in therapy, then these compounds may be administered orally in the form of solid or liquid preparations or they may be administered by the rectal route in the form of suppositories. Solid dosage forms for the administration of the new oxime-anthrone compounds include tablets, granules, capsules and powders and the liquid dosage forms include solutions, syrups, tinctures and elixirs.

In the preparation of the solid dosage forms the preferred oxime-anthrone is mixed with a diluent in a ratio of 1 part active ingredient to from 1 part to 100 parts of diluent. To prepare tablets the diluted mixture is granulated and to the granulation are added tablet binders and lubricants, such as are well known in the art, and then the whole is compressed into tablets of suitable size and shape.

Salts of the respective new oxime derivatives would not be expected to form in view of the liability of the oxime group. The oxime group is well known to decompose under both alkaline and acid conditions. Thus, even in the presence of the carboxyl group, where it would be expected to form an alkaline salt, the usual methods of salt formation result only in degradative products.

The mixture of the active compound and inert diluent may be filled into gelatin capsules of suitable size and shape to prepare the capsule dosage form or the active ingredient may be used alone to prepare capsules. The mixture of active ingredient and diluent, when granulated to a particle size of not less than No. 16 standard mesh size, and not greater than No. 8, standard mesh size, may be administered as a granule dosage form.

The oxime anthrones may be dissolved or suspended in pharmaceutically acceptable aqueous or hydroalcoholic vehicles, to form the appropriate liquid dosage from pharmaceutical preparations. These solutions may be sweetened to obtain the respective syrup or elixir dosage form depending upon the type of solvent used.

Suppositories are prepared by dispersing the appropriate quantity of the desired oxime-anthrone compound in a pharmaceutically acceptable suppository base, as for example, polyoxyethylene glycol, which is known in the trade as "Carbowax" or cocoa butter, or other suitable suppository base, and then shaped into proper size to contain the desired therapeutic dose.

The dosage of the respective new oxime anthrone compounds when used in therapy, whether in solid or liquid dosage form, is between 1 mgm. and 75 mgm. of active compound per unit dose, depending upon the particular intensity of the peristaltic stimulation desired as well as the age and physical status of the patient. Thus, an infant will require a lower dose than would an adult, and an aged individual with a predisposition to hypermotility of the gastrointestinal tract would also require a lower dose than would a young adult. Should it be desired to utilize these new compounds for the cleansing of the colon and rectum prior to either radiologic or protoscopic examination, as a means of preparing the patient for surgery, then the higher dosage ranges should be used. The broad flexibility provided by the use of a more potent compound, having predictable and reproducible peristaltic stimulant properties, permits a new degree of individualized therapy which was not obtainable with the older drugs. The following examples illustrate the scope of this invention.

EXAMPLE 1

To a solution of 11.2 gm. of potassium hydroxide, dissolved in 40 ml. of ethanol, is added a boiling solution of 12 gm. of hydroxyl amine hydrochloride, dissolved in 200 ml. of ethanol. The solution is filtered and to the filtrate is added 1 gm. of rheinanthrone. The mixture is refluxed for 1 hour and cooled to room temperature. A solid precipitate forms which is filtered and dried. The dried precipitate rheinanthrone oxime is brown in color and does not melt at temperatures above 300° C. The compound fails to give the characteristic color test for rheinanthrone, an emerald green color with p-nitrosodimethylaniline.

The ultraviolent spectrum of the new compound rheinanthrone oxime was determined with the Beckman Recording Spectrophotometer and compared with known precurser compounds, rhein and rheinanthrone. The respective compounds were dissolved in ethyl acetate at a concentration level of approximately 0.4 percent (w./v.) and showed the following absorption peaks:

Rheinanthrone oxime: 420 m$\mu$ (weak), 315 m$\mu$ (weak), 260 m$\mu$ and 255 m$\mu$. There is a shoulder at 272 m$\mu$.
Rheinanthrone: 365 m$\mu$, 295 m$\mu$, 260 m$\mu$ and 255 m$\mu$ with a shoulder at 272 m$\mu$.
Rhein: 430 m$\mu$, 260 m$\mu$, 255 m$\mu$, and shoulders at 285 m$\mu$ and 272 m$\mu$.

The shift of the peaks to 420 m$\mu$ and 315 m$\mu$ for the new compound establishes the oxime derivative.

The infrared spectrum for the new compound was determined with a Perkin-Elmer, Model 137, Infra-Cord Spectrophotometer. The new compound rheinanthrone oxime obtained as described above was studied as a Nujol mull and gave the following values:

Rheinanthrone oxime: COO (1695 cm.$^{-1}$) percent T greater than CO, CO (1640 cm.$^{-1}$) percent T less than rhein, new peaks at 3400 and 955 (NOH) cm.$^{-1}$.

The infrared spectrum of rheinanthrone and rhein were also studied by the same method and gave the following values:

Rheinanthrone: COO (1700 cm.$^{-1}$) percent T less than CO, CO split (1600, 1620 cm.$^{-1}$).
Rhein: COO (1700 cm.$^{-1}$) percent T less than CO, CO 1625 cm.$^{-1}$).

These studies establish the new compound to be the oxime of 1,8-dihydroxy-3-carboxyanthrone.

EXAMPLE 2

In a three-neck flask, fitted with a reflux condenser, stirrer and inlet tube, is placed a solution of 5 gm. of 1,8-dihydroxy-3-carboxyanthrone in 250 ml. of ethanol. The solution is warmed and a mixture of 17.5 gm. of hydroxylamine hydrochloride and 27 gm. of sodium acetate, both dissolved in 50 cc. of water, are added to the refluxing ethanol solution, through the inlet tube. The mixture is then refluxed for an additional 2 hours and poured into 1 liter of ice-water and refrigerated. The solid crystalline precipitate is filtered and dried and corresponds in every way to the product obtained as a result of Example 1 above.

EXAMPLE 3

To a mixture of 0.1 gm. of hydroxylamine hydrochloride in 1 ml. of pyridine and 1 ml. of absolute ethanol is added 0.2 gm. of 1,8-dihydroxy-3-carboxyanthrone. The mixture is allowed to stand at room temperature for a period of at least 1 hour and then the solvent removed with a stream of warm air. The residue is dissolved in ethanol and set aside to crystallize. The crystalline material is filtered and dried and it compares in every respect to the compound obtained in Example 1 above.

EXAMPLE 4

To 75 ml. of potassium tert-amylate solution were added 2.7 g. (0.04 mole) of hydroxylamine hydrochloride and 8.1 g. (0.03 mole) of rheinanthrone in a 125 ml. Erlenmeyer flask. The flask was stoppered tightly and allowed to stand at room temperature in the dark for about 32 days. The flask was shaken daily to disperse suspended material. The mixture was diluted with water and filtered. The residue was washed well and dried in vacuum. A 78% yield of deep purple product was obtained. The melting point of the product was over 300° C. The compound obtained is rheinanthrone-oxime or the oxime of 1,8-dihydroxy-3-carboxy anthrone and compares in every way to the compound obtained as the result of Example 1, described above.

EXAMPLE 5

In place of the 1,8-dihydroxy-3-carboxyanthrone used in Examples 1, 2, and 3 above, may be substituted equimolecular amounts of anthrone, 1,8-dihydroxyanthrone, 1,8-dihydroxy-3-methylanthrone or 1,8-dihydroxy-3-hydroxy-methylanthrone. The remainder of the steps being the same and the respective products obtained are the oxime of anthrone, the oxime of 1,8-dihydroxyanthrone.

EXAMPLE 6

To a dispersion of 57.0 grams of 1,8-dihydroxy-3-carboxy anthrone oxime in 300 ml. of distilled water is slowly added a solution of 6 grams of calcium hydroxide dissolved in 400 ml. of distilled water. The mixture is stirred, and the solvent evaporated to ⅓ its volume, preferably under vacuum. To the resulting mixture is then added three volumes of alcohol and the precipitate collected. The precipitate is washed twice with water and then dried. The dried precipitate is the bis-1,8-dihydroxy-3-carboxy anthrone oxime calcium salt, having a molecular weight of 584. It is insoluble in water and starts to melt at 289°–293° C. with decomposition. The compound analyzes in good agreement with the theoretical value for calcium: Theory 6.85 percent, found 6.34 percent. The structural formula may be shown as follows:

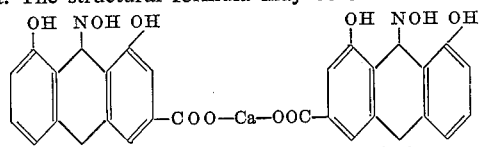

In place of the calcium hydroxide solution, as used above, there may be substituted in equivalent quantities any other basic salt of calcium, as for example: calcium oxide, calcium carbonate, calcium bicarbonate, calcium acetate, or calcium succinate. There is an advantage to using the calcium oxide, calcium carbonate or calcium bicarbonate since by-products are avoided.

Under carefully controlled conditions, whereby a large excess of the calcium ion in proportion to the 1,8-dihydroxy-3-carboxyanthrone oxime is utilized, as far example, at least 4 mols of the calcium ion for each mol of rheinanthrone oxime is used, then the hydroxy metallic salt is obtained, 1,8-dihydroxy-3-carboxy calcium hydroxyanthrone oxime having a molecular weight of 329. The calcium content of the new compound was found to contain 10.96% which compares favorably to the theoretical value of 12.6%. This compound melts above 300° C., with decomposition, and is insoluble in water and organic solvents. It is stable to heat and exhibits the same ultra-violet spectrum as the bis substituted calcium compound described above. The structural formula may be given as follows:

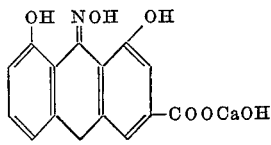

EXAMPLE 7

When it is desired to form other bis-rheinanthrone metallic derivatives in addition to that described in Example 6, above, then these may be formed through the use of the appropriate divalent metallic oxide, hydroxide, carbonate, bicarbonate acetate and succinate salts. The metallic ions which are preferred for this purpose are magnesium, iron, and zinc. When carrying out the reaction process, it is preferable to use either a dilute aqueous solution of the respective metallic salt, when the respective compound is soluble in water, or to add the divalent metallic compound to the dispersion of the 1,8-dihydroxy-3-carboxyanthrone oxime. Gentle heating may be employed to bring the reaction to completion but temperatures exceeding 50° C. should not be used.

When preparing these compounds molecular equivalent quantities to that described for the calcium salt (Example 6) are utilized. The bis-metallic compound is obtained when a ratio of the last 2 moles of the rheinanthrone oxime is employed for each mole of divalent metallic ion used. The remainder of the steps are the same as described in Example 6, and the appropriate bis-rheinanthrone oxime metal salt is obtained as, for example, bis-rheinanthrone oxime magnesium, bis-rheinanthrone oxime iron, and bis-rheinanthrone oxime zinc. These compounds all decompose above 300° C. and are insoluble in water. The iron salt is brown in color, whereas the magnesium and zinc salts are white. The respective compounds analyze in good agreement with the theoretical values for the respective metallic ions.

| Compound | Metal analysis | |
|---|---|---|
|  | Percent theory | Percent found |
| bis-Rheinanthrone oxime magnesium | Mg, 4.1 | Mg, 4.4. |
| bis-Rheinanthrone oxime iron | Fe, 9.2 | Fe, 8.8. |
| bis-Rheinanthrone oxime zinc | Zn, 10.7 | Zn, 10.3. |

The structural formula for these compounds is:

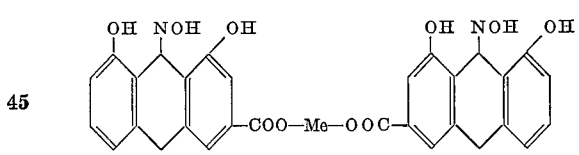

where Me may be Magnesium, (Mg), Iron, (Fe), or Zinc, (Zn).

EXAMPLE 8

In place of the calcium hydroxide, described in Example 6 above, may be substituted equivalent molecular quantities of sodium hydroxide, sodium acetate and sodium succinate, sodium carbonate, sodium bicarbonate, potassium hydroxide, potassium carbonate, potassium bicarbonate, potassium acetate, potassium succinate; lithium hydroxide, lithium carbonate, lithium bicarbonate, lithium acetate or lithium succinate and the remainder of the steps being the same. When carrying out the salt forming reaction it is necessary to control the pH of the solution so that decomposition does not result. This may be achieved by controlling the rate of addition of the alkaline component and exerting critical control to avoid an uneven distribution of ions within the solution. Stirring should be maintained throughout the reaction period when the alkaline component is added. The yield of the respective salts obtained is in excess of 90 percent, but when pH control is not instituted the yield falls to virtually zero.

When the above monovalent metallic salts are used, then the resultant new compound formed is the respective 1,8-dihydroxy-3-carboxy sodium anthrone oxime: 1,8-dihydroxy-3-carboxy potassium anthrone oxime and 1,8-dihydroxy-3-lithium anthrone oxime.

The physical properties of the above-formed sodium, potassium and lithium salts are as follows:

| Salt | Melting Point | Solubility | Metal analysis | |
|---|---|---|---|---|
| | | | Percent theory | Percent found |
| 1,8-dihydroxy-3-carboxy, sodium anthrone oxime | Dec. above 300° C | Sol. in H₂O, Ethanol | Na, 8.0 | Na, 7.9. |
| 1,8-dihydroxy-3-carboxy, potassium anthrone oxime | do | do | K, 12.09 | K, 13.6. |
| 1,8-dihydroxy-3-carboxy lithium anthrone oxime | do | do | Li, 2.4 | Li, 3.1. |

The respective alkaline salts described above are soluble in water and are alkaline in reaction. When the pH is brought below pH 4 decomposition occurs. In the purification of the respective salts described above, alcohol precipitation is the preferred technique and for this purpose 70 percent alcohol is utilized. The structural formula for these compounds may be represented as:

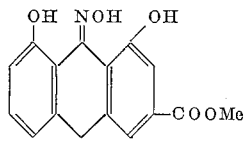
—COOMe where "Me" may be sodium (Na), Potassium (K) and Lithium (Li)

EXAMPLE 9

When it is desired to administer the oxime of anthrone, the oxime of 1,8-dihydroxyanthrone, the oxime of 1,8-dihydroxy-3-methylanthrone, the oxime of 1,8-dihydroxy-3-hydroxymethylanthrone or the oxime of 1,8-dihydroxy-carboxyanthrone, in the therapy of mammals, then the respective compounds may be administered in solid or liquid unit dosage form containing from 1 to 75 mg. of active compound. The compounds are preferably administered at bedtime to achieve a peristaltic stimulant action 6 to 8 hours later. The pharmacologic activity of the respective compounds is exerted in a gentle and uniform manner without the occurrence of noxious side effects. The desired degree of bowel cleansing may be obtained by adjusting the quantity of active ingredient used. Thus, should it be intended to administer these compounds in order to supplement and stimulate the tonic activity of the bowel, then lower dosages may be utilized. However, when the purgative effects intended for the complete cleansing of the bowels, such as would be required for pre-radiologic, or pre-protoscopic examination or in the preparation of the patient for surgery, then the higher dosage ranges would be utilized. Similarly, the age and physical status of the patient will modify the dosage of the active ingredient used. The new compounds, when used in therapy, are generally administered once daily, although more frequent dosage may be desired for certain patients.

The liquid dosage forms of the new oxime anthrone derivatives described in Examples 1 through 5 may be prepared in the form of a solution or a dispersion, utilizing pharmaceutically accepted solvents, such as water, ethanol or mixture of these, which may be sweetened or flavored. Should it be desired to prepare a tincture then the appropriate alcoholic concentration as is required for this class of pharmaceuticals may be used or should a syrup be desired, then the appropriate concentration of sugar may be utilized. In preparing the liquid pharmaceutical dosage forms of the new compounds, then the appropriate amount of the respective new anthrone-oxime derivative is either dissolved or suspended in the solvent so that each unit dose will contain from one to seventy-five mg. of the respective active compound selected.

Should it be desired to utilize a solid dosage form, then tablets, capsules, granules or powders may be prepared so that each unit dose contains from one to seventy-five mg. of the respective new compound. Tablets are prepared by mixing one part of the selected active ingredient with from 1 to 100 parts of a diluent, as for example, starch, sucrose or lactose. The mixture is granulated with a granulating solution, such as water or alcohol, and pharmaceutically suitable lubricants and binders added. The mixture is then compressed into suitable size and shape so that each tablet contains from one to seventy-five mg. of active ingredients.

The mixture of the active ingredient and diluent, prepared above, may be filled into capsules of suitable size and shape so that each capsule contains from one to seventy-five mg. of active ingredient per unit dose. The mixture prepared for compression into tablets may also be used to prepare a granule. When a granule is desired, the aforesaid mixture is moistened with water or alcohol and passed through a standard mesh sieve so that its particle size is between a No. 8 standard mesh and a No. 16 standard mesh size. In certain instances it may be desired to administer a powder and then one part of the appropriate active compound is mixed with 10 to 200 parts of a diluent such as lactose or sucrose and the mixture is subdivided into unit powder doses so that each unit dose contains from one to seventy-five mg. of the respective active compound.

What is claimed is:
1. A compound selected from the group consisting of anthrone-oximes of the formula,

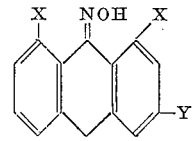

wherein X is selected from the group consisting of a hydrogen atom and a hydroxyl group and Y is selected from the group consisting of a hydrogen atom, methyl group, hydroxymethyl group, carboxyl group and a carboxymetal group in which the metal is selected from the group consisting of sodium, potassium, lithium, calcium hydroxy, magnesium hydroxy, ferrous hydroxy and zinc hydroxy ions and

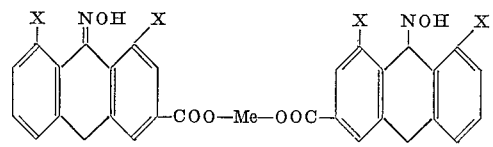

wherein X is selected from the group consisting of a hydrogen atom and a hydroxyl group and Me is a metal ion selected from the group consisting of calcium, magnesium, zinc and iron ions.

2. A compound of claim 1 wherein X and Y are hydrogen atoms said compound being 9, 10-dihydro-10-oxime anthracene.

3. A compound of claim 1 wherein X is a hydroxyl group and Y is a hydrogen atom, said compound being 1,8-dihydroxy-anthrone-oxime.

4. A compound of claim 1 wherein X is a hydroxyl group and Y is a methyl group, said compound being 1,8-dihydroxy-3-methyl-anthrone-oxime.

5. A compound of claim 1 wherein X is a hydroxyl group and Y is a hydroxy-methyl group, said compound being 1,8 - dihydroxy-3-hydroxy-methyl-anthrone-oxime.

6. A compound of claim 1 wherein X is a hydroxyl group and Y is a carboxyl group, said compound being 1,8-dihydroxy-3-carboxy-anthrone-oxime.

7. A compound of claim 1 wherein X is a hydroxyl group and Y is a carboxy metal group, said metal group being sodium and said compound being sodium rheinanthrone-oxime.

8. A compound of claim 1 wherein X is a hydroxyl group and Y is a carboxy metal group, said metal group being potassium and said compound being potassium rheinanthrone-oxime.

9. A compound of claim 1 wherein X is a hydroxyl group and Y is a carboxy metal group, said metal group being lithium and said compound being lithium rheinanthrone-oxime.

10. A compound of claim 1 wherein X is a hydroxyl group and Me group is calcium and said compound being bis-(1,8-dihydroxy - 3 - carboxy-anthrone-oxime) calcium.

11. A compound of claim 1 wherein X is a hydroxyl group and Me group is iron and said compound being bis-(1,8 - dihydroxy - 3 - carboxy-anthrone-oxime) iron.

12. A compound of claim 1 wherein X is a hydroxyl group and Me group in zinc and said compound being bis-(1,8 - dihydroxy - 3 - carboxy-anthrone-oxime) zinc.

13. A compound of claim 1 wherein X is a hydroxyl group and Me group is magnesium and said compound being bis-(1,8 - dihydroxy - 3 - carboxy-anthrone-oxime) magnesium.

14. A compound of claim 1 wherein X is a hydroxyl group and Y is a carboxy metal group, said metal group being hydroxy-calcium and said compound being calcium hydroxy-rheinanthrone-oxime.

15. A compound of claim 1 wherein X is a hydroxyl group and Y is a carboxy metal group, said metal group being hydroxy-zinc and said compound being zinc hydroxy-rheinanthrone-oxime.

16. A compound of claim 1 wherein X is a hydroxyl group and Y is a carboxy metal group, said metal group being hydroxy-magnesium and said compound being magnesium hydroxy-rheinanthrone-oxime.

17. A compound of claim 1 wherein X is a hydroxyl group and Y is a carboxy metal group and said metal group being hydroxy-iron and said compound being iron hydroxy-rheinanthrone-oxime.

References Cited

Beilstein, 3rd supplement; band 7, System No. 654 pp. 2361, 2362 (1968).

LORRAINE, A. WEINBERGER, Primary Examiner

E. J. SKELLY, Assistant Examiner

U.S. Cl. X.R.

424—289, 295, 317, 327